United States Patent
Yamasaki et al.

(10) Patent No.: US 7,632,400 B2
(45) Date of Patent: Dec. 15, 2009

(54) WATER TREATMENT EQUIPMENT

(75) Inventors: Kazuyuki Yamasaki, Hiroshima (JP);
Kazuyuki Sakata, Fukuyama (JP);
Kazumi Chuhjoh, Takamatsu (JP);
Masaki Kataoka, Fukuyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/812,462

(22) Filed: Jun. 19, 2007

(65) Prior Publication Data

US 2008/0029459 A1   Feb. 7, 2008

(30) Foreign Application Priority Data

Aug. 4, 2006  (JP) .............................. 2006-213320

(51) Int. Cl.
*B03D 1/14* (2006.01)
*B01D 33/70* (2006.01)
(52) U.S. Cl. .................. 210/150; 210/151; 210/220; 210/198.1; 210/221.2
(58) Field of Classification Search ................ 210/220, 210/150–151, 198.1, 221.2
See application file for complete search history.

(56) References Cited

U.S. PATENT DOCUMENTS

| | | | | |
|---|---|---|---|---|
| 5,876,697 A | * | 3/1999 | Soetanto | 424/9.52 |
| 6,126,815 A | * | 10/2000 | Kelada | 210/94 |
| 6,565,758 B1 | * | 5/2003 | Thomas | 210/776 |
| 2003/0042200 A1 | * | 3/2003 | Hoage et al. | 210/620 |
| 2006/0054205 A1 | | 3/2006 | Yabe et al. | |

FOREIGN PATENT DOCUMENTS

| | | | | |
|---|---|---|---|---|
| JP | 63031590 A | * | 2/1988 | |
| JP | 08309336 A | * | 11/1996 | |
| JP | 2000070922 A | * | 3/2000 | |
| JP | 2003-334548 | | 11/2003 | |
| JP | 2004-121962 | | 4/2004 | |
| JP | 2004-321959 | | 11/2004 | |
| JP | 2006218344 A | * | 8/2006 | |

OTHER PUBLICATIONS

"Portable Turbidity Monitoring Sensor TD-M500," http://www.optex.co.jp/env/eng/products/tdm500/index.html, downloaded Dec. 11, 2008.*

Serizawa, et. al., "Laminarization of micro-bubble containing milky bubbly flow in a pipe," 3rd European-Japanese Two-Phase Flow Group Meeting, Certosa di Pontignano, Sep. 21-27, 2003.*

* cited by examiner

*Primary Examiner*—Chester T Barry
(74) *Attorney, Agent, or Firm*—Nixon & Vanderhye P.C.

(57) ABSTRACT

A water treatment equipment has a raw water tank as a mixing section, a micronanobubble generation tank, a floatation tank, and a treated water tank. Waste water as treatment water is introduced into the raw water tank and mixed with the water containing micronanobubbles produced by the micronanobubble generation tank. Thereafter, the waste water, as treatment water, is introduced into a lower mixing section of the floatation tank from the raw tank by a raw water tank pump. Also, treatment water containing fine bubbles is introduced into the lower mixing section from a pressure tank. Therefore, the micronanobubbles is mixed with the fine bubbles in the lower mixing section of the floatation tank, thereby almost all the suspended matter in the treatment water is surfaced. Thus, the water treatment equipment enhances separatability of suspended matter.

6 Claims, 8 Drawing Sheets

WATER TREATMENT EQUIPMENT

CROSS-REFERENCE TO RELATED APPLICATION

This nonprovisional application claims priority under 35 U.S.C. §119(a) on Patent Application No. 2006-213320 filed in Japan on 04 Aug. 2006, the entire contents of which are incorporated herein by reference.

BACKGROUND OF THE INVENTION

The present invention relates to a water treatment method and water treatment equipment. This present invention specifically relates to a water treatment method and water treatment equipment in which a pressure flotation device using fine bubbles is combined with micronanobubbles so as to ensure more perfect removal of suspended matter in treatment water.

Conventionally, there has been water treatment equipment including a pressure flotation device in which suspended matter in treated water is enveloped with fine bubbles contained in pressurized water, and thereby the suspended matter is surfaced and isolated so that the suspended matter is separated from the treated water.

Now, it is demanded to enhance the separatability of the suspended matter by the pressure flotation device.

SUMMARY OF THE INVENTION

An object of the present invention is to provide a water treatment method and water treatment equipment which can enhance the separatability of the suspended matter.

To achieve the above-mentioned object, the present invention provides a water treatment method, comprising the steps of:

mixing water containing micronanobubbles and treatment water to produce water containing micronanobubbles with transparency of 15 cm or less; and introducing the treatment water, which has contained micronanobubbles in the mixing step, into a pressure flotation device for water treatment.

According to the present invention, treatment water containing micronanobubbles is introduced into the pressure flotation device, so that these micronanobubbles are attached to ultrafine suspended solid in treatment water. The ultrafine suspended solid having these micronanobubbles attached thereto is then surfaced by fine bubbles generated in the pressure flotation device. Thus, it is possible to easily surface the ultrafine suspended matter in treatment water and separate from the treatment water, while the ultrafine suspended matter has been hardly removed by the conventional flotation system. It is to be noted that the micronanobubbles are smaller in size and larger in adhesion to the suspended matter than the fine bubbles generated in the pressure flotation device. As used herein, the treatment water is defined as water to be treated or water receiving treatment.

In other words, the fine bubbles generated in the pressure flotation device also adhere to the surface suspended matter so as to surface it, while the micronanobubbles are still finer than the fine bubbles and have strong adhesion. Therefore, the micronanobubbles adhere to finer suspended matter in large numbers, and consequently make it possible to surface the finer suspended matter up to the fluid surface level. Thus, both the fine bubbles and the micronanobubbles (i.e. ultrafine bubbles) allow considerable enhancement in the separatability of the suspended matter in treatment water.

Description is here given of three kinds of bubbles. The microbubbles are bubbles which have a bubble size of 10 to several dozen micrometers during their generation. The microbubbles change to "micronanobubbles" due to contraction movements after their generation. The micronanobubbles are ultrafine bubbles having a diameter of about 10 micrometers to hundreds of nm. The nanobubbles are ultrafine bubbles having a diameter of hundreds of nm or less.

In one embodiment of the present invention, the water containing micronanobubbles is produced by using treated water resulting from the water treatment.

According to this embodiment, since the treated water from which the suspended matter was removed is used for production of water containing micronanobubbles, such a trouble as clogging in the micronanobubble generator is totally eliminated. The micronanobubble outlet in the micronanobubble generator may have the trouble of clogging when there are floating particles such as contaminants underwater because the micronanobubble outlet is small in diameter.

Separation treatment of suspended matter is conducted a plurality of times by using the pressure flotation device while treated water is circulated. Therefore, it becomes possible to remove the suspended matter from treatment water with more certainty.

The present invention provides a water treatment equipment, comprising:

a mixing section for mixing water containing micronanobubbles with transparency of 15 cm or less and treatment water; and a pressure flotation device for receiving the treatment water containing micronanobubbles introduced from the mixing section.

According to the invention, treatment water containing micronanobubbles is introduced into the pressure flotation device. In this way, these micronanobubbles are attached to ultrafine suspended solid in treatment water. The ultrafine suspended solid having these micronanobubbles attached thereto is then surfaced by fine bubbles generated in the pressure flotation device. Therefore, the ultrafine suspended matter in treatment water, which could not be removed by the conventional pressure flotation device, can be surfaced and separated from the treatment water.

In one embodiment of the present invention, the mixing section is a raw water tank for receiving treatment water, the pressure flotation device has a floatation tank, there are provided: a micronanobubble generation tank having a micronanobubble generator for producing the water containing micronanobubbles; and a treated water tank for receiving treated water from the floatation tank, and treated water is introduced into the micronanobubble generation tank from the treated water tank, while water containing micronanobubbles is introduced into the raw water tank from the micronanobubble generation tank.

According to this embodiment, micronanobubbles generated in the micronanobubble generator are used in the micronanobubble generation tank. Here, in the micronanobubble generation tank, the water containing micronanobubbles is produced by using the treated water from the floatation tank. Therefore, troubles such as clogging of the micronanobubble generator are completely eliminated. On the other hand, because the micronanobubble outlet of the micronanobubble generator structurally is small in diameter, the micronanobubble outlet may have suffered clogging when floating particles such as contaminants exist in the treated waste water.

In one embodiment of the present invention, the water treatment equipment further comprises a micronanobubble generating aid adding section for adding a micronanobubble generating aid to the micronanobubble generation tank.

According to this embodiment, it is possible to enhance generating efficiency of micronanobubbles by a micronanobubble generating aid added to the micronanobubble generation tank.

In one embodiment of the present invention, the micronanobubble generating aid is a liquid containing surfactant.

According to this embodiment, it is possible to enhance generating efficiency of micronanobubbles by the micronanobubble generating aid containing surfactant. It is to be noted that appropriate selection of surfactants having sufficient resolvability might prevent environmental problems attributed to surfactants.

In one embodiment of the present invention, the water treatment equipment further comprises a fine membrane filter device for receiving treated water introduced from the treated water tank.

According to this embodiment, it is possible to secure treated water having more sufficient water quality. This is because fine-microfiltration is conducted by introducing the treated water with the suspended matter separated from the treated water tank into the fine-microfiltration device. Thereby, the application range of the treated water after treatment can be expanded.

In one embodiment of the present invention, the water treatment equipment further comprises:
 a fine membrane filter device for receiving treated water introduced from the treated water tank; and
 a reverse osmosis membrane device for receiving treated water introduced from the fine membrane filter device.

According to this embodiment, the fine membrane filter device and the reverse osmosis membrane device make it possible to secure the treated water having further more sufficient water quality. Thereby, the application range of the treated water after treatment can be expanded.

In one embodiment of the present invention, the micronanobubble generator is a submerged pump-type micronanobubble generator.

According to this embodiment, the submerged pump-type micronanobubble generator is simple in structure, easy to install and easy to maintain like submerged pumps.

In one embodiment of the present invention, the water treatment equipment further comprises:
 a biological treatment device for receiving treatment water containing micronanobubbles introduced from the mixing section,
 wherein the treatment water containing micronanobubbles, which has been subjected to biological treatment by the biological treatment device, is introduced into the pressure flotation device.

According to this embodiment, micronanobubbles make it possible to enhance the activity of microorganisms in biological treatment by the biological treatment device. Therefore, it becomes possible to enhance the water quality of the treatment water containing micronanobubbles introduced into the pressure flotation device from the biological treatment device. As a result, the water quality of the treated water obtained from the pressure flotation device can be enhanced. A slight amount of micronanobubbles remaining in biologically treated water join the fine bubbles in the pressure flotation device, resulting in implementation of a synergistic effect of removing the suspended matter in floatation.

In one embodiment of the present invention, the water treatment equipment further comprises
 a biological treatment device for receiving treatment water containing micronanobubbles,
 wherein the treatment water containing micronanobubbles, which has been subjected to biological treatment by the biological treatment device, is introduced as treatment water into the mixing section.

According to this embodiment, micronanobubbles make it possible to enhance the activity of microorganisms in biological treatment by the biological treatment device, and therefore the water quality of treated water after biological treatment can be increased. As a result, it becomes possible to enhance the water quality of the treated water obtained from the pressure flotation device which received treatment water containing micronanobubbles after biological treatment. Further in this embodiment, micronanobubbles in the water containing micronanobubbles are further added to and contained in the treatment water containing micronanobubbles after biological treatment as treatment water. Therefore, the micronanobubbles in the treatment water join the fine bubbles produced by the pressure flotation device, resulting in implementation of a synergistic effect of removing the suspended matter in floatation.

In one embodiment of the present invention, the water treatment equipment further comprises:
 a first micronanobubble generation tank for producing the water containing micronanobubbles;
 a first raw water tank for receiving treatment water and water containing micronanobubbles introduced from the first micronanobubble generation tank;
 a biological treatment device for receiving treatment water containing micronanobubbles introduced from the first raw water tank;
 a second micronanobubble generation tank for producing water containing micronanobubbles; and
 a second raw water tank for receiving water containing micronanobubbles introduced from the second micronanobubble generation tank and treatment water containing micronanobubbles, which has been subjected to biological treatment, introduced from the biological treatment device,
 wherein the first raw water tank and the second raw water tank constitute the mixing section, and
 wherein the treatment water containing micronanobubbles is introduced into the pressure flotation device from the second raw water tank.

According to this embodiment, water treatment equipment is structured which generates micronanobubbles in two steps with use of the first and second micronanobubble generation tanks. That is to say, the water containing micronanobubbles, which are produced by the first micronanobubble generation tank, enhances the activity of microorganisms in the biological treatment device so as to improve water quality of the treatment water after biological treatment. Further, this treatment water after biological treatment is made to additionally contain the water containing micronanobubbles produced by the second micronanobubble generation tank. Consequently, fine bubbles and micronanobubbles which differ in size are joined in the pressure flotation device, resulting in implementation of a synergistic effect of removing the suspended matter in floatation.

In one embodiment of the present invention, the water treatment equipment further comprises:
 a fine-microfiltration device for receiving treatment water introduced from the pressure flotation device; and
 a reverse osmosis membrane device for receiving treatment water introduced from the fine-microfiltration device.

According to this embodiment, the treatment water, which has been subjected to the advanced removal treatment of the suspended matter by the pressure flotation device, is further subjected to filtration treatment by a fine-microfiltration device and a reverse osmosis membrane device. As a result, it is possible to secure the treated water having considerably sufficient water quality, and therefore water having a wide range of application can be obtained.

In one embodiment of the present invention, a flocculating agent is added to the raw water tank.

According to this embodiment, the flocculating agent flocculates components of the treatment water in the raw water tank to form flocs. Micronanobubbles and fine air bubbles from the pressure flotation device attach to the flocs having various sizes, and then the flocs surface and separate from the treatment water to enhance quality in the treated water.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Hereinbelow, the present invention will be described in details in conjunction with the embodiments with reference to the drawings.

FIRST EMBODIMENT

Figure 1:
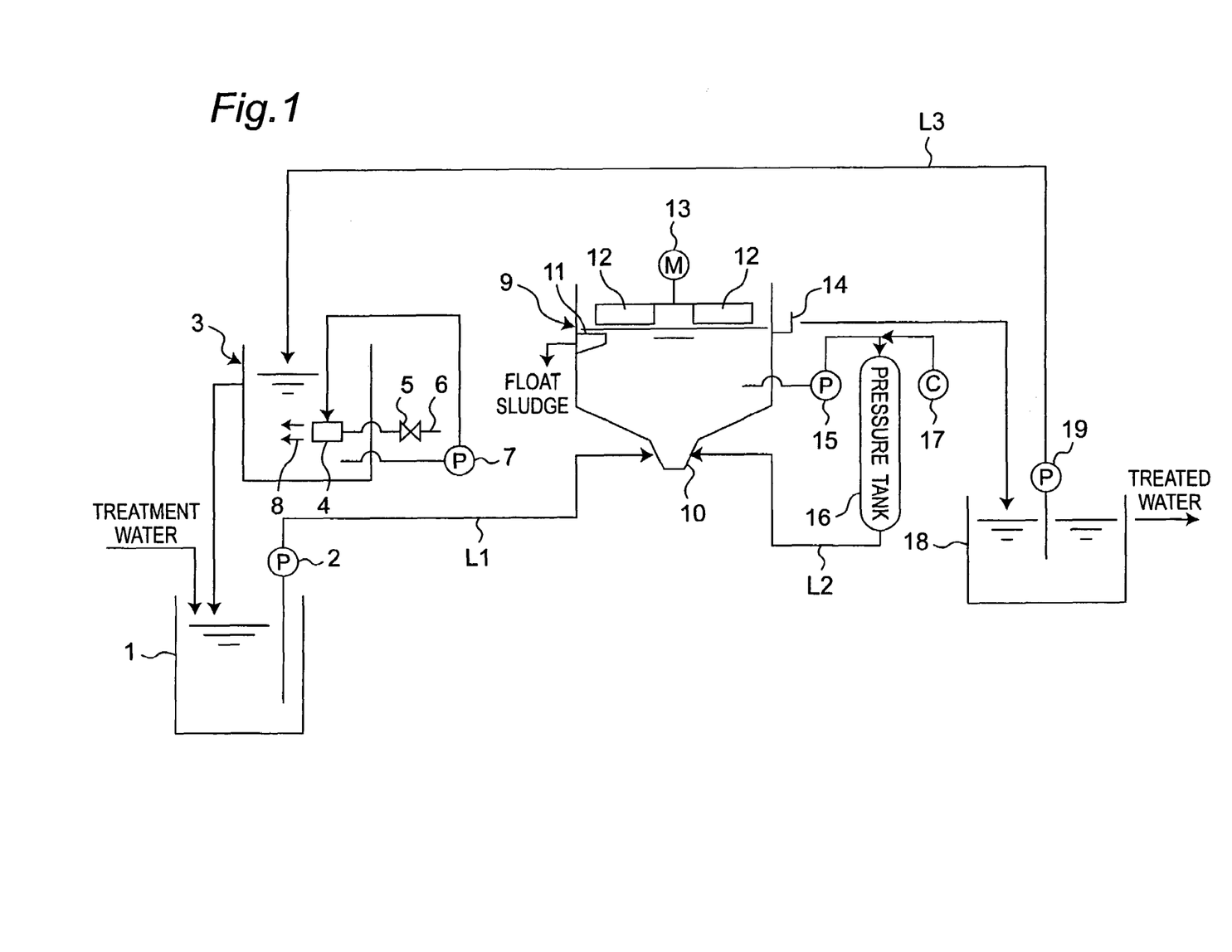
FIG. 1 is a schematic view showing water treatment equipment in a first embodiment of the present invention.

FIG. 1 is a schematic view showing water treatment equipment in a first embodiment of the present invention. In FIG. 1, treatment water, as influent water, is introduced into a raw water tank 1 so as to be treated.

In the first embodiment, the water treatment equipment is mainly composed of a raw water tank 1 as a mixing section, a micronanobubble generation tank 3, a floatation tank 9, and a treated water tank 18.

The treatment water for the water treatment equipment in the first embodiment include waste water, industrial water and supplied water which contain suspended matter from any industries. In FIG. 1, reference numeral 2 denotes a raw water tank pump. The water containing micronanobubbles is produced in the micronanobubble generation tank 3, and then is introduced into the raw water tank 1 serving as a mixing section. In the raw water tank 1, the water containing micronanobubbles is mixed with waste water from a plant as an example of treatment water. Thereafter, the mixed water, as the treatment water, is introduced into a lower mixing section 10 of the floatation tank 9 by the raw water tank pump 2. The treatment water introduced into the lower the mixing section 10 of the floatation tank 9 is water containing micronanobubbles with transparency of 15 cm or less, for example.

A micronanobubble generator 4 is placed in the micronanobubble generation tank 3. A required amount of circulating water is supplied to the micronanobubble generator 4 by a circulating pump 7. Required air is adjusted by a valve 5 and supplied to the micronanobubble generator 4 via an air suction pipe 6, and thereafter optimal micronanobubbles are generated by the micronanobubble generator 4.

When micronanobubbles are generated by the micronanobubble generator 4, water stream 8 is generated in the micronanobubble generation tank 3. The water stream 8 stirs the inside of the micronanobubble generation tank 3. On the other hand, treated water is supplied to the micronanobubble generation tank 3, where the treated water is returned from the treated water tank 18 by a treated water tank return pump 19. In the micronanobubble generation tank 3, there is produced water containing micronanobubbles with transparency of 15 cm or less, for example.

Then, by the raw water tank pump 2, the treatment water containing micronanobubbles is introduced into the lower mixing section 10 of the floatation tank 9 via a line L1 from the raw water tank 1. The treatment water in the floatation tank 9 is sent out to a pressure tank 16 by a pressure tank pump 15 placed outside the floatation tank 9. Also, air is pressurized and sent out to the pressure tank 16 by a compressor 17. Fine bubbles are generated when the pressurized air is emitted to the lower mixing section 10 of the pressure floatation tank 9.

Thus, the treatment water containing micronanobubbles from the line L1 and the treatment water containing fine bubbles from the line L2 are introduced into the lower mixing section 10 and mixed therein. In the lower mixing section 10 of the pressure floatation tank 9, therefore, both the micronanobubbles and the fine bubbles are generated in a mixed state, by which almost all the suspended matter in the treatment water can be surfaced.

Specifically, in this embodiment, the pressure flotation device 9 itself generates fine bubbles so as to adhere to and surface the suspended matter. Added micronanobubbles are still finer and more adhesive than the fine bubbles generated in the pressure flotation device 9. Therefore, micronanobubbles not only adhere to finer suspended matter in large numbers, but also micronanobubbles make it possible to increase floatation force to the suspended matter because the fine bubbles adhere to the suspended matter to which micronanobubbles already adhere. Particularly, the fine bubbles adhere to the suspended matter to which micronanobubbles already adhere make it possible to more easily surface and separate the ultrafine suspended matter, which was conventionally difficult to surface the ultrafine suspended matter.

As a result, the suspended matter finer than before can be surfaced, and therefore the separatability of the suspended matter in treatment water can considerably be enhanced with use of both the fine bubbles and the ultrafine bubbles (i.e. micronanobubbles).

In the floatation tank 9, the suspended matter which has surfaced to the water surface is scraped by a scraping plate 12 rotated by a scraper 13. Thereafter, the suspended matter is discharged from a float sludge discharge section 11. As a material of the scraping plate 12, it is possible to employ sheet steel, plastics or wood, for example.

Next, the treated water in the upper part of the floatation tank 9 moves to the treated water section 14, and flows into the treated water tank 18 from the treated water section 14. The treated water coming from the treated water tank 18 serves as treated water having a wide range of application, wherein the suspended matter was certainly separated.

The treated water in the treated water tank 18 is also returned to the micronanobubble generation tank 3 through the line L3 by the treated water tank pump 19. That is to say, the treated water from the floatation tank 9 is used for producing the water containing micronanobubbles in the micronanobubble generation tank 3. Therefore, troubles such as clogging of the micronanobubble generator 4 are completely eliminated.

The micronanobubble generator 7 may be any one of commercially available micronanobubble generators. As a specific example thereof, the inventor employed the micronanobubble generator made by Nanoplanet Research Institute Corporation and by Aura Tec Corporation, though the manufacturers are not limited thereto. Other available products include a micro bubble water generating apparatus made by Seika Corporation or Shigenkaihatsu Corporation for example. These generators may be selected depending on purposes.

SECOND EMBODIMENT

Figure 2:
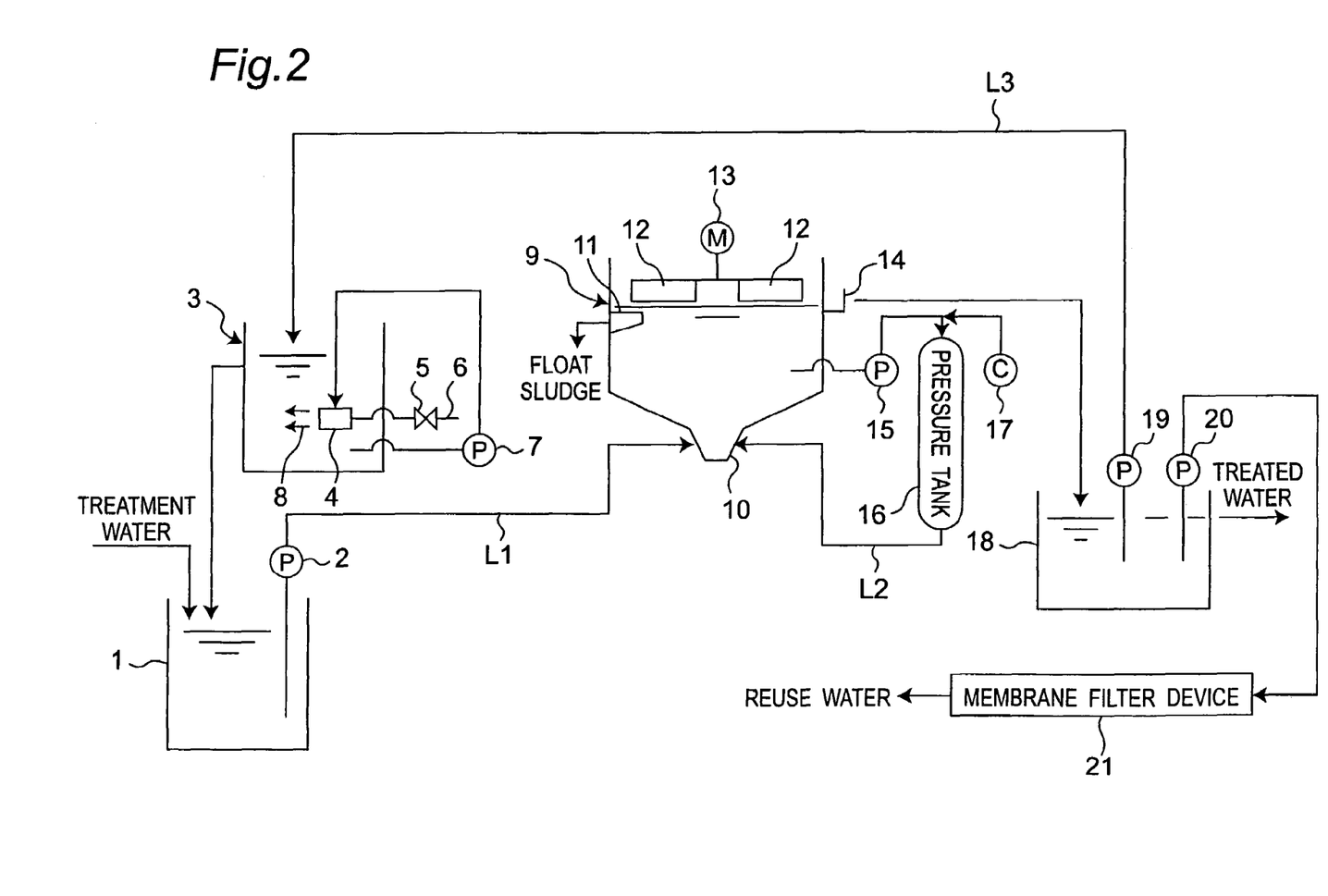
FIG. 2 is a schematic view showing water treatment equipment in a second embodiment of the present invention.

Next, FIG. 2 shows water treatment equipment in a second embodiment of the present invention. This second embodiment is different from the first embodiment in the point that a fine membrane filter device transfer pump 20 is placed in the treated water tank 18 in the first embodiment of FIG. 1 and in the point that a fine membrane filter device 21 is placed on the downstream side of the treated water tank 18. Therefore, in the second embodiment, component members identical to those in the first embodiment are designated by identical reference numerals. Detailed description of the identical component members is omitted. Description will be given of members different from the first embodiment.

In the second embodiment, as shown in FIG. 2, the treated water in the treated water tank 18 is transferred to the fine membrane filter device 21 by the fine membrane filter device transfer pump 20 for microfiltration treatment. Therefore, it is possible to remove a slight amount of suspended matter and floating particles remaining in the treated water in the treated water tank 18. As a result, the water quality is more enhanced, so that the application range of the resultant treated water is widened. More specifically, the water obtained from the fine membrane filter device 21 serves as water for various utilization.

It is possible to decrease clogging in the fine membrane filter device 21 by transferring the treated water from the treated water tank 18 of the second embodiment to the fine membrane filter device 21, in comparison with the case where the treated water from the conventional pressure flotation device having no the micronanobubble system is introduced into the fine membrane filter device. This makes it possible to reduce replacement frequency of the membrane.

THIRD EMBODIMENT

Figure 3:
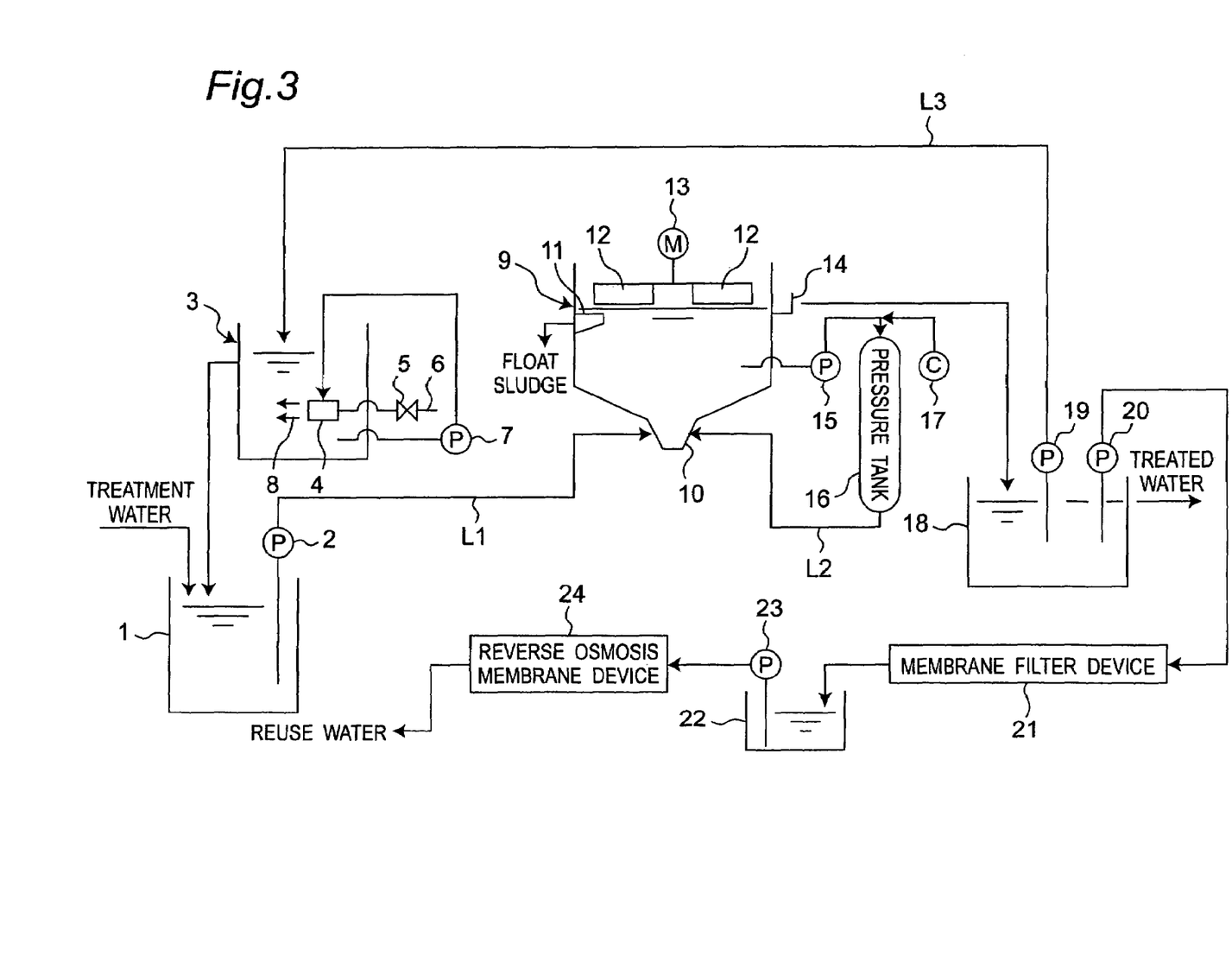
FIG. 3 is a schematic view showing water treatment equipment in a third embodiment of the present invention.

Next, FIG. 3 shows water treatment equipment in a third embodiment of this invention. The third embodiment is different from the first embodiment in the point that a fine membrane filter device transfer pump 20 is placed in the treated water tank 18 in the first embodiment of FIG. 1 and in the point that a fine membrane filter device 21, a fine membrane filter device pit 22, a fine membrane filter device pit pump 23, and a reverse osmosis membrane device 24 are placed on the downstream side of the treated water tank 18. Therefore, in the third embodiment, component members identical to those in the first embodiment are designated by identical reference numerals. Detailed description of the identical component members is omitted. Description will be given of members different from the first embodiment.

In the third embodiment, the treated water in treated water tank 18 is transferred by a fine membrane filter device transfer pump 20 to the fine membrane filter device 21, where filtration treatment is performed, before being introduced into the fine membrane filter device pit 22. Further, the treated water is transferred from the fine membrane filter device pit 22 to the reverse osmosis membrane device 24 by the fine membrane filter device pit pump 23 for further filtration treatment.

Therefore, in the third embodiment, the treated water obtained from the treated water tank 18 is further treated by the fine membrane filter device 21 and then by the reverse osmosis membrane device 24. As a result, a slight amount of suspended matter, floating particles and dissolved ions remaining in the treated water can be removed so that the water quality of the resultant treated water can be enhanced, and application range of water is expanded.

Moreover, in the third embodiment, the treated water obtained from the floatation tank 9 is transferred to the fine membrane filter device 21 and to the reverse osmosis membrane device 24. Therefore, it is possible to decrease clogging in fine membrane filter device 21 and the reverse osmosis membrane device 24 in comparison with the case where the treated water obtained from the conventional pressure flotation device having no the micronanobubble system is introduced into the fine membrane filter device and the reverse osmosis membrane device. This makes it possible to reduce replacement frequency of the membrane.

FOURTH EMBODIMENT

Figure 4:
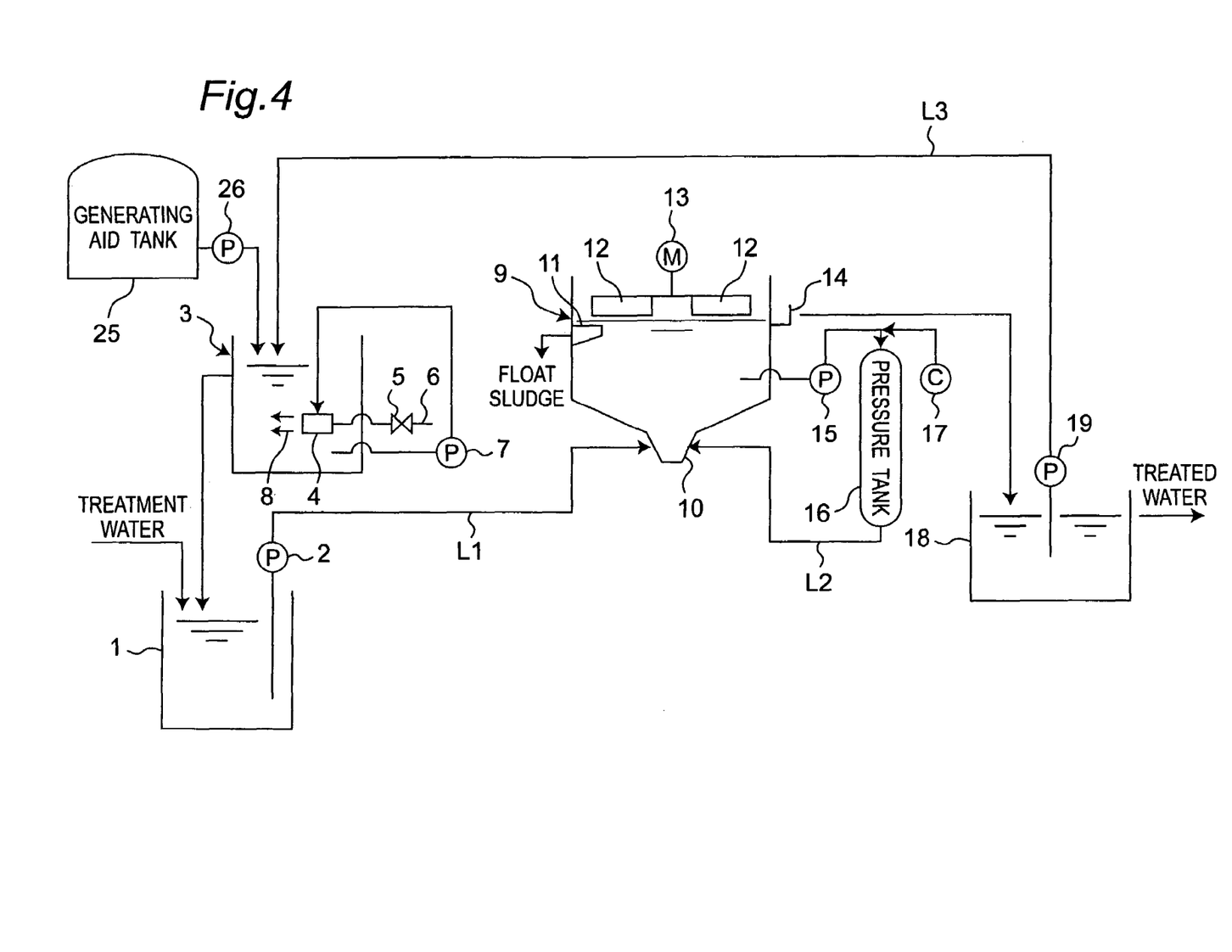
FIG. 4 is a schematic view showing water treatment equipment in a fourth embodiment of the present invention.

Next, FIG. 4 shows water treatment equipment in a fourth embodiment of this invention. The fourth embodiment is different from the first embodiment in the point that a micronanobubble generating aid tank 25 and a generating aid pump 26 are provided for adding a micronanobubble generating aid to the micronanobubble generation tank 3 in the first embodiment of FIG. 1. Therefore, in the fourth embodiment, component members identical to those in the first embodiment are designated by identical reference numerals. Detailed description of the identical component members is omitted. Description will be given of members different from the first embodiment.

In the fourth embodiment, it is possible to add the micronanobubble generating aid to the micronanobubble generation tank 3 from the micronanobubble generating aid tank 25 with use of a generating aid pump 26. Therefore, it becomes possible to generate micronanobubbles in the micronanobubble generation tank 3 under optimal conditions. As a result, in the fourth embodiment, the separatability of the suspended matter in the floatation tank 9 can be enhanced, and the water quality of the treated water obtained from the floatation tank 9 can be increased.

FIFTH EMBODIMENT

Figure 5:
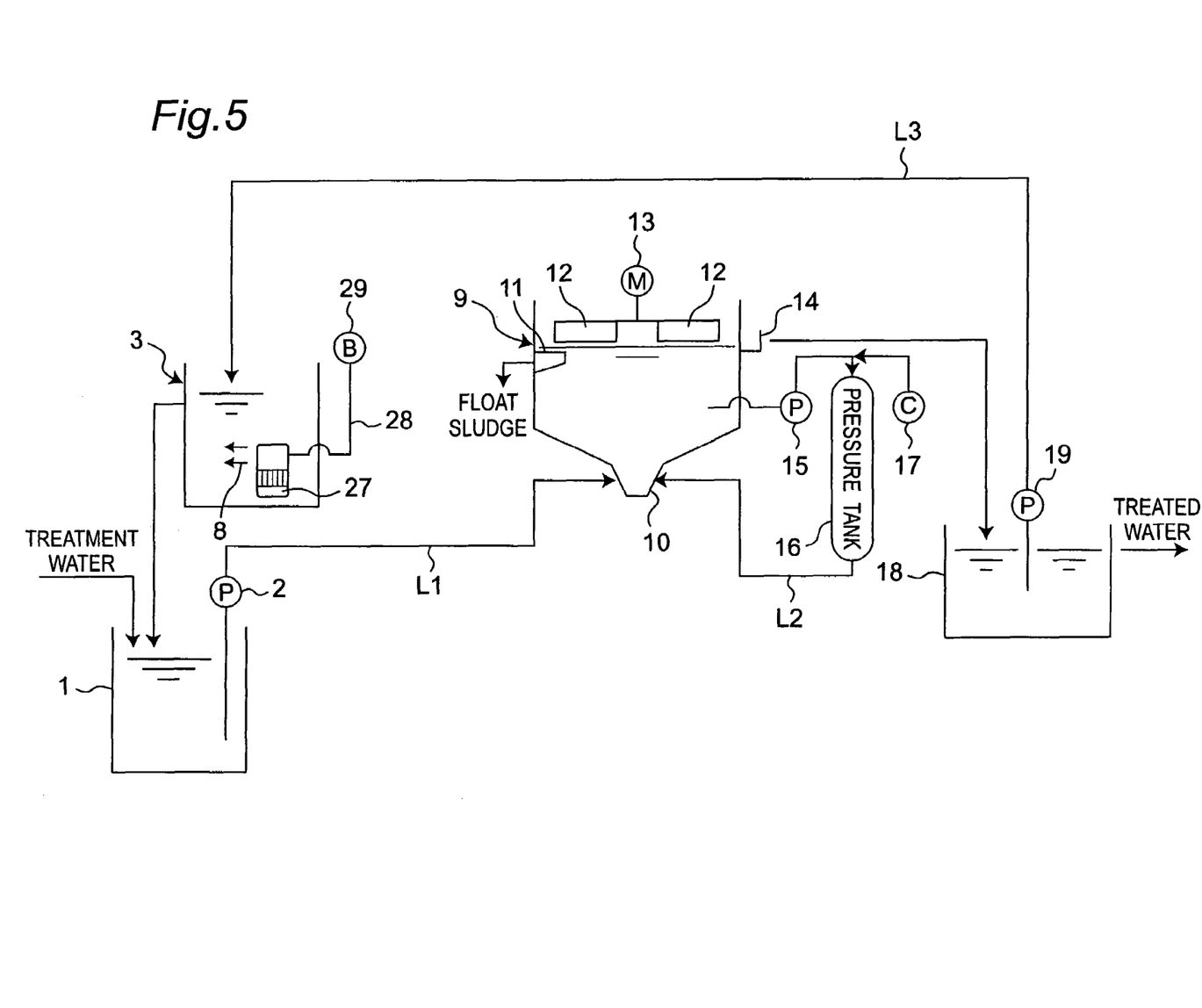
FIG. 5 is a schematic view showing water treatment equipment in a fifth embodiment of the present invention.

Next, FIG. 5 shows water treatment equipment in a fifth embodiment of this invention. The fifth embodiment is different from the first embodiment in the point that the micronanobubble generator 4 in the micronanobubble generation tank 3 in the first embodiment of FIG. 1 is replaced with a submerged pump-type micronanobubble generator 27. Therefore, in the fifth embodiment, component members identical to those in the first embodiment are designated by identical reference numerals. Detailed description of the identical component members is omitted. Description will be given of members different from the first embodiment.

In the fifth embodiment, the submerged pump-type micronanobubble generator 27 is placed in the micronanobubble generation tank 3. This submerged pump-type micronanobubble generator 27 has an advantage of easiness in installation and maintenance. The air supply to the submerged pump-type micronanobubble generator 27 is carried out by a small blower 29 and an air line 28. It is to be noted that as a specific example, the generator made by Nomura Electronics Co., Ltd. may be used as a submerged pump-type micronanobubble generator 27.

SIXTH EMBODIMENT

Figure 6:
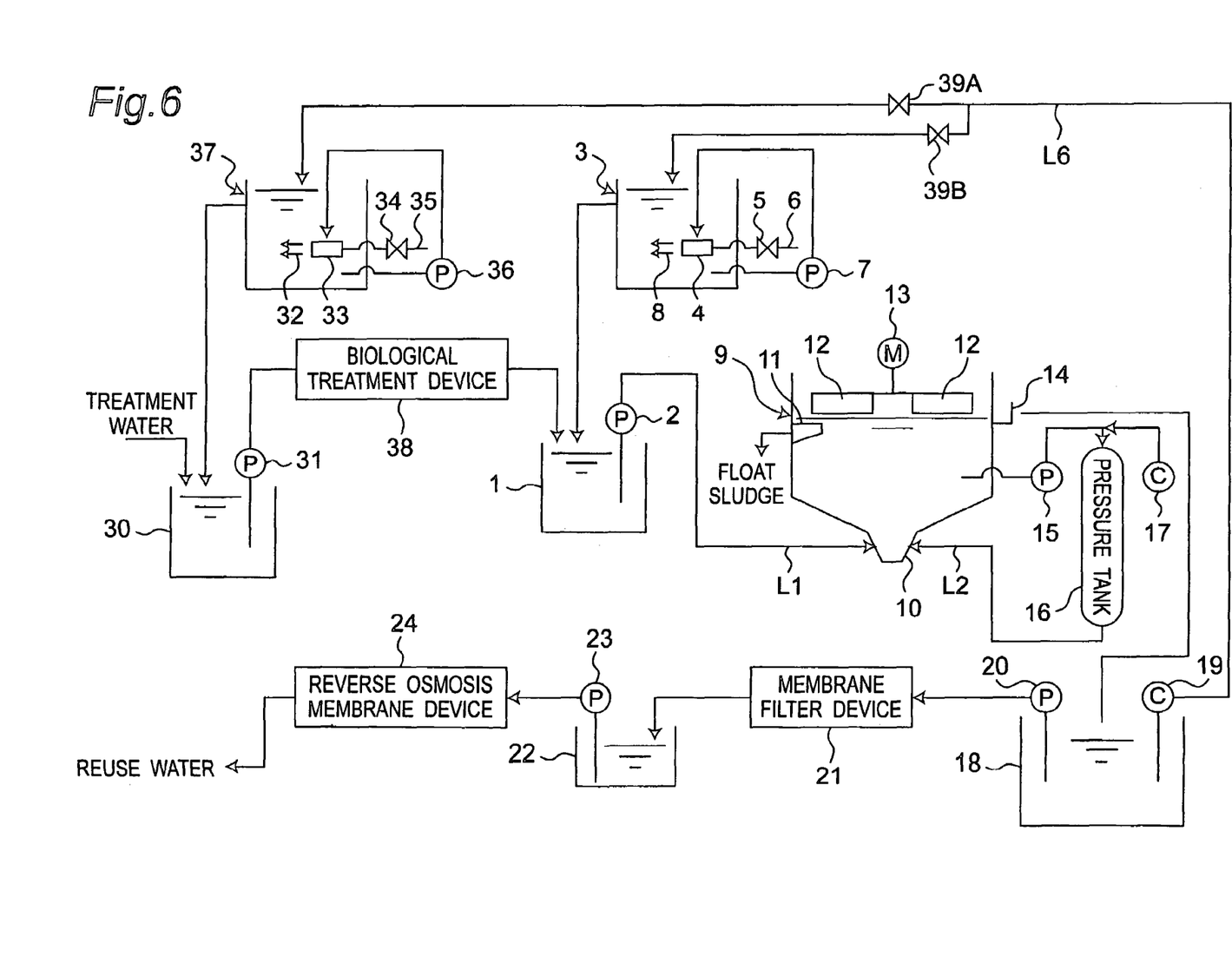
FIG. 6 is a schematic view showing water treatment equipment in a sixth embodiment of the present invention.

Next, FIG. 6 shows water treatment equipment in a sixth embodiment of this invention. The sixth embodiment is different from the third embodiment in the following points (i) to (iii).

(i) The raw water tank 1 and the micronanobubble generation tank 3 in the third embodiment of FIG. 3 are used as a second raw water tank 1 and a second micronanobubble generation tank 3, and a first raw water tank 30 and a first micronanobubble generation tank 37 are placed on the upstream side of the second raw water tank 1;

(ii) A biological treatment device 38 is placed between the first raw water tank 30 and the second raw water tank 1; and (iii) The treated water from the treated water tank return pump 19 is transferred to the first and second micronanobubble generation tanks 37 and 3 through a branch line L6 having valves 39A and 39B.

Therefore, in the sixth embodiment, component members identical to those in the third embodiment are designated by identical reference numerals. Detailed description of the identical component members is omitted, and description will be given of the members different from the third embodiment.

In the third embodiment, treatment water which is raw water is introduced into the first raw water tank 30, and then the water containing micronanobubbles produced in the first micronanobubble generation tank 37 is introduced into the treatment water.

Then, treatment water containing micronanobubbles is introduced from the first raw water tank 30 into the biological treatment device 38. Therefore, in the biological treatment device 38, microorganisms are activated by the micronanobubbles contained in the treatment water. As the result, the performance of the biological treatment device 38 is enhanced. At the same time, the water quality of the treatment water from the biological treatment device 38 is increased.

It is to be noted that the micronanobubble generator 33 is placed in the first micronanobubble generation tank 37. A required amount of circulating water is supplied to the micronanobubble generator 33 by means of a circulating pump 36. Required air is adjusted by a valve 34 before being supplied through an air suction pipe 35 to the micronanobubble generator 33 where optimal micronanobubbles are generated. The micronanobubbles, which are generated by the micronanobubble generator 33, generate water stream 32 to stir the inside of the micronanobubble generation tank 37.

The treated water in the treated water tank 18 is introduced, as feed water, into the micronanobubble generation tank 37 through the branch line L6 and the valve 39A by the treated water tank return pump 19. The amount of feed water supplied to the micronanobubble generation tank 37 is adjusted by adjustment of the valve 39A while the amount of feed water is checked. The amount of the treated water supplied to the second micronanobubble generation tank 3 through the branch line L6 is also adjusted by adjustment of the valve 39B while the amount of the treated water is checked.

In the sixth embodiment, water treatment equipment can be structured which generates micronanobubbles in two steps with use of the first and second micronanobubble generation tanks 37, 3. That is, in this embodiment, the water containing micronanobubbles produced by the first micronanobubble generation tank 37 enhances the activity of microorganisms in the biological treatment device 38, so that the water quality of the treatment water after biological treatment is increased. Further, the treatment water after biological treatment by the biological treatment device 38 is made to additionally contain the water containing micronanobubbles produced by the second micronanobubble generation tank 3. Consequently, fine bubbles and micronanobubbles which differ in size are joined in the pressure flotation device 9, resulting in implementation of a synergistic effect of removing the suspended matter in floatation.

SEVENTH EMBODIMENT

Figure 7:
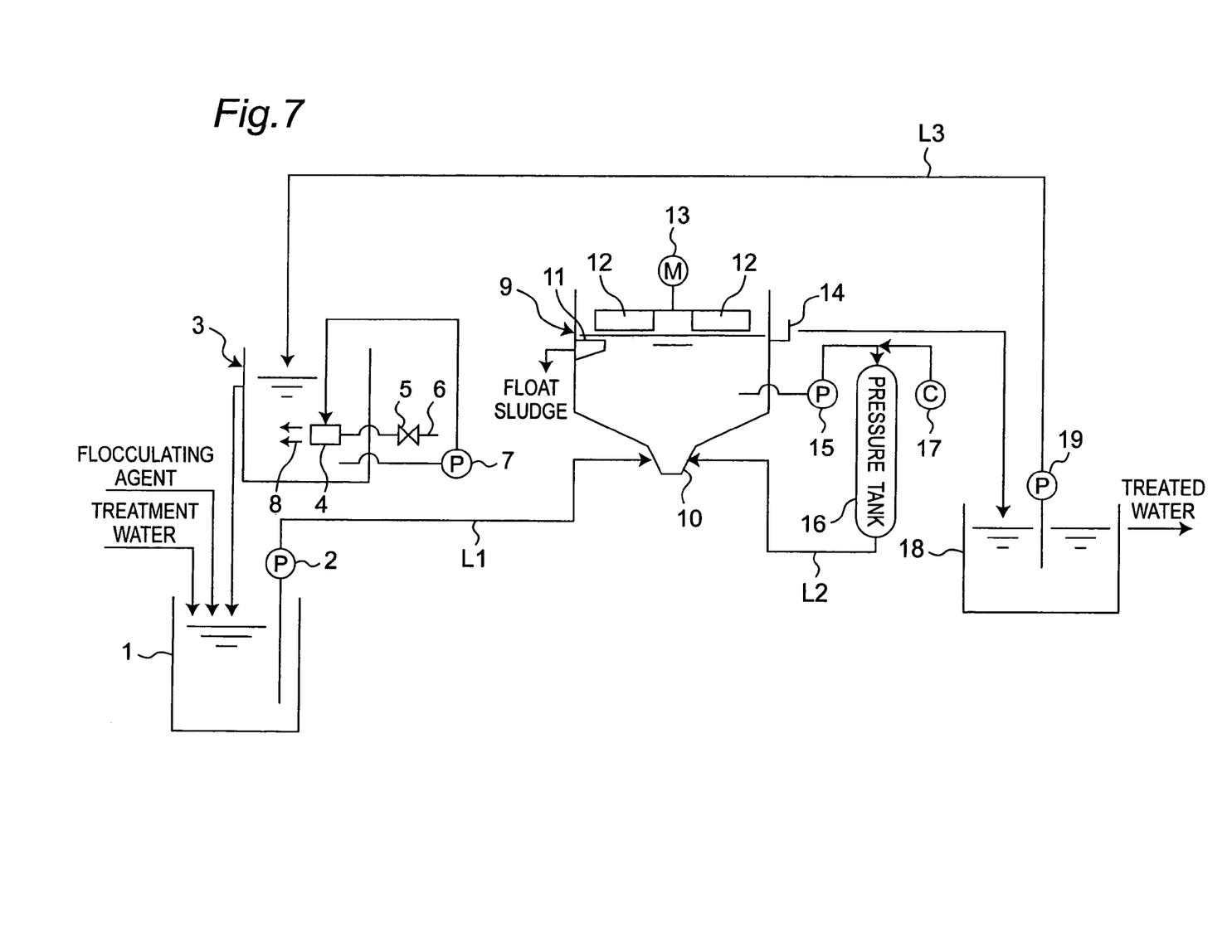
FIG. 7 is a schematic view showing water treatment equipment in a seventh embodiment of the present invention.

Next, FIG. 7 shows water treatment equipment in a seventh embodiment of this invention. This seventh embodiment is different from the first embodiment in the point that a flocculating agent is added to the raw water tank 1 in the first embodiment of FIG. 1. Therefore, in the seventh embodiment, component members identical to those in the third embodiment are designated by identical reference numerals. Detailed description of the identical component members is omitted. Description will be given of members different from the first embodiment.

In the seventh embodiment, a flocculating agent for treatment water is added to the raw water tank 1 while the water containing micronanobubbles is also introduced into the raw water tank 1. Thereby, components of the treatment water flocculate with the flocculating agent to form flocs. The treatment water is transferred to the floatation tank 9 in the state that micronanobubbles are attached to the flocs. In short, in the seventh embodiment, the components of the treatment water flocculate with the flocculating agent to form flocs in the raw water tank 1. Then, in the lower mixing section 10 of the floatation tank 9, the suspended matter in the treatment water is subjected to surface treatment by using both the micronanobubbles contained in the treatment water and the fine air babbles from the floatation tank 9.

EIGHTH EMBODIMENT

Figure 8:
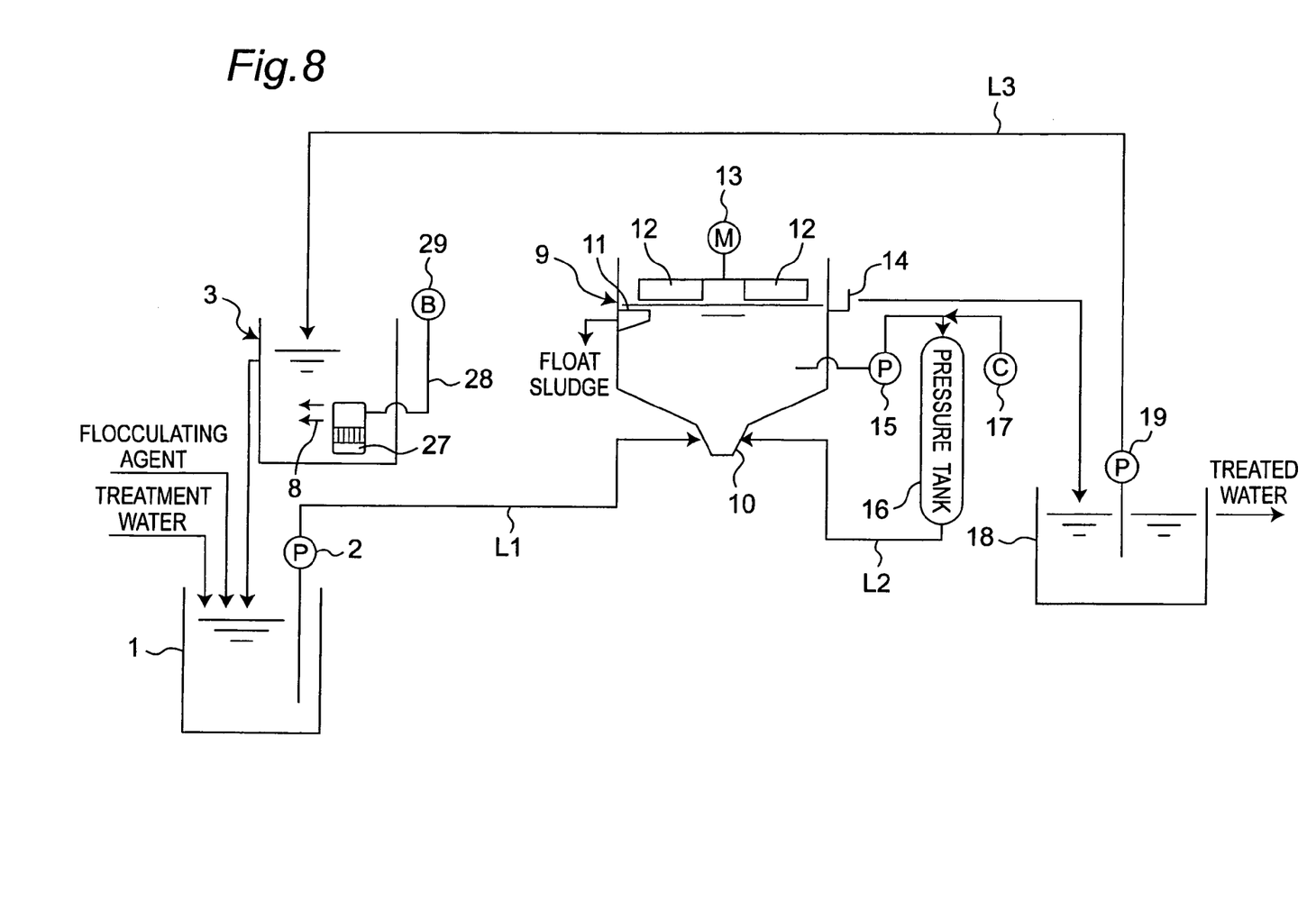
FIG. 8 is a schematic view showing water treatment equipment in an eighth embodiment of the present invention.

Next, FIG. 8 shows water treatment equipment in an eighth embodiment of this invention. This eighth embodiment is different from the fifth embodiment in the point that a flocculating agent is added to the raw water tank 1 in the fifth embodiment shown in FIG. 5. Therefore, in the eighth embodiment, component members identical to those in the fifth embodiment are designated by identical reference numerals. Detailed description of the identical component members is omitted. Description will be given of members different from the fifth embodiment.

In the eighth embodiment, a flocculating agent for treatment water is added to the raw water tank 1, and the water containing micronanobubbles is also introduced therein. Therefore, in the raw water tank 1, components of the treatment water flocculate with the flocculating agent to form flocs, and the treatment water is transferred to the lower mixing section 10 of the floatation tank 9 in the state that micronanobubbles are attached to the flocs. In short, in the eighth embodiment, the components of the treatment water flocculate with the flocculating agent to form flocs. Then, the flocs are subjected to surface treatment by using both the micronanobubbles contained in the treatment water and the fine air babbles from the floatation tank 9.

EXPERIMENTAL EXAMPLE

An experimental device was manufactured corresponding to the water treatment equipment of the first embodiment in FIG. 1. In the experimental device, the capacity of the raw water tank 1 was about 1 $m^3$, the capacity of the micronanobubble generation tank 3 was 2 $m^3$, the capacity of the floatation tank 9 was 3 $m^3$, and the capacity of the treated water tank 18 was the 1 $m^3$. A trial run was made for about three months with waste water introduced into the experimental device as treatment water. After this trial run, the removal rate of floating particles was measured by measuring the floating particle concentration in the treatment water at the inlet port of the raw water tank 1 and the floating particle concentration in the treated water at the outlet port of the treated water tank 18. The removal rate was 95%.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

The invention claimed is:

1. Water treatment equipment, comprising:
a micronanobubble generation tank having a micronanobubble generator for producing water containing micronanobubbles and having transparency of 15cm or less:
a raw water tank as
a mixing section for receiving and mixing treatment water and the water containing micronanobubbles from the micronanobubble generation tank; and
a pressure flotation device including a floatation tank for receiving the treatment water containing micronanobubbles introduced from the raw water tank
a biological treatment device for receiving treatment water containing micronanobubbles introduced from the mixing section,
wherein the treatment water containing micronanobubbles, which has been subjected to biological treatment by the biological treatment device, is introduced into the pressure flotation device.

2. Water treatment equipment, comprising:
a micronanobubble generation tank having a micronanobubble generator for producing water containing micronanobubbles and having transparency of 15cm or less;
a raw water tank as
a mixing section for receiving and mixing treatment water and the water containing micronanobubbles from the micronanobubble generation tank; and
a pressure flotation device including a floatation tank for receiving the treatment water containing micronanobubbles introduced from the raw water tank
a biological treatment device for receiving treatment water containing micronanobubbles,
wherein the treatment water containing micronanobubbles, which has been subjected to biological treatment by the biological treatment device, is introduced as treatment water into the mixing section.

3. Water treatment equipment, comprising:
a micronanobubble generation tank having a micronanobubble generator for producing water containing micronanobubbles and having transparency of 15cm or less;
a raw water tank as
a mixing section for receiving and mixing treatment water and the water containing micronanobubbles from the micronanobubble generation tank; and
a pressure flotation device including a floatation tank for receiving the treatment water containing micronanobubbles introduced from the raw water tank
a biological treatment device for receiving treatment water containing micronanobubbles introduced from the raw water tank;
a second micronanobubble generation tank for producing water containing micronanobubbles; and
a second raw water tank for receiving water containing micronanobubbles introduced from the second micronanobubble generation tank and treatment water containing micronanobubbles, which has been subjected to biological treatment, introduced from the biological treatment device,
wherein the treatment water containing micronanobubbles is introduced into the floatation tank of the pressure flotation device from the second raw water tank.

4. The water treatment equipment according to claim 3, comprising:
a fine-microfiltration device for receiving treatment water introduced from the pressure floatation device; and
a reverse osmosis membrane device for receiving treatment water introduced from the fine-microfiltration device.

5. Water treatment equipment, comprising:
a micronanobubble generation tank having a micronanobubble generator for producing water containing micronanobubbles and having transparency of 15cm or less;
a raw water tank as
a mixing section for receiving and mixing treatment water and the water containing micronanobubbles from the micronanobubble generation tank; and
a pressure flotation device including a floatation tank for receiving the treatment water containing micronanobubbles introduced from the raw water tank
wherein the pressure floatation device is formed by the floatation tank, a compressor, a pressure tank and a pressure tank pump.

6. The water treatment equipment according to claim 3, wherein the water containing micronanobubbles in the second micronanobubble generation tank has transparency of 15 cm or less.

* * * * *